(12) United States Patent
Eberlein

(10) Patent No.: US 11,347,873 B2
(45) Date of Patent: May 31, 2022

(54) AGGREGATED AUTHORIZATIONS IN A CLOUD PLATFORM

(71) Applicant: SAP SE, Walldorf (DE)

(72) Inventor: Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 244 days.

(21) Appl. No.: 16/577,953

(22) Filed: Sep. 20, 2019

(65) Prior Publication Data

US 2021/0089665 A1 Mar. 25, 2021

(51) Int. Cl.
*G06F 21/60* (2013.01)
*G06F 21/62* (2013.01)
*G06F 9/445* (2018.01)
*G06F 8/61* (2018.01)
*G06F 11/30* (2006.01)

(52) U.S. Cl.
CPC .............. *G06F 21/604* (2013.01); *G06F 8/63* (2013.01); *G06F 9/44505* (2013.01); *G06F 11/302* (2013.01); *G06F 21/62* (2013.01); *G06F 2221/2141* (2013.01)

(58) Field of Classification Search
CPC ........ G06F 21/604; G06F 21/62; G06F 21/60; G06F 21/31; G06F 21/41; G06F 21/445; G06F 8/63; G06F 2221/2141; G06F 9/44505; G06F 11/302; H04L 63/101; H04L 63/102; H04L 63/104; H04L 63/107; H04L 63/20
See application file for complete search history.

(56) References Cited

U.S. PATENT DOCUMENTS

| 10,142,371 | B2 * | 11/2018 | Sastry | H04L 63/102 |
| 10,637,868 | B2 * | 4/2020 | Schleiff | H04L 63/104 |
| 2014/0181992 | A1 * | 6/2014 | Janson | G06F 21/60 726/27 |
| 2014/0343989 | A1 * | 11/2014 | Martini | H04L 63/104 705/7.17 |
| 2018/0302353 | A1 * | 10/2018 | Ma | G06F 21/31 |
| 2020/0004442 | A1 * | 1/2020 | Caswell | H04L 63/104 |

* cited by examiner

*Primary Examiner* — Shaqueal D Wade-Wright
(74) *Attorney, Agent, or Firm* — Schwegman Lundberg & Woessner, P.A.

(57) ABSTRACT

Various examples are directed to a cloud platform system that comprises a plurality of cloud platform deployments including a first cloud platform deployment implemented at a first geographic region and a second cloud platform deployment implemented at a second geographic region. An access manager system receives from a user computing device, a user logon request identifying a user. The access manager system also receives, from an identity provider system, group data associated with the user logon request, the group data indicating a first group to which the user belongs. The access manager system determines that a subaccount access map correlates the first group to a first subaccount that is implemented at the first cloud platform deployment. The access manager system also provides the user computing device an indication that the user is authorized to access the first subaccount.

20 Claims, 10 Drawing Sheets

US 11,347,873 B2

AGGREGATED AUTHORIZATIONS IN A CLOUD PLATFORM

TECHNICAL FIELD

This document generally relates to methods and systems for use with computing systems. More particularly, this document relates to ways of authorizing users of a cloud platform computing system.

BACKGROUND

Cloud platform computing systems, often referred to as cloud platforms or Platform as-a-Service (PaaS), provide users with access to computing system functionality with reduced need for the user to maintain physical computer infrastructure. Instead, the cloud platform includes physical infrastructure that is used to provide computing services to the user. The user accesses the cloud platform via a network. Applications and/or other computing services are provided to the user via the network.

BRIEF DESCRIPTION OF DRAWINGS

The present disclosure is illustrated by way of example and not limitation in the following figures.

DETAILED DESCRIPTION

Figure 1:
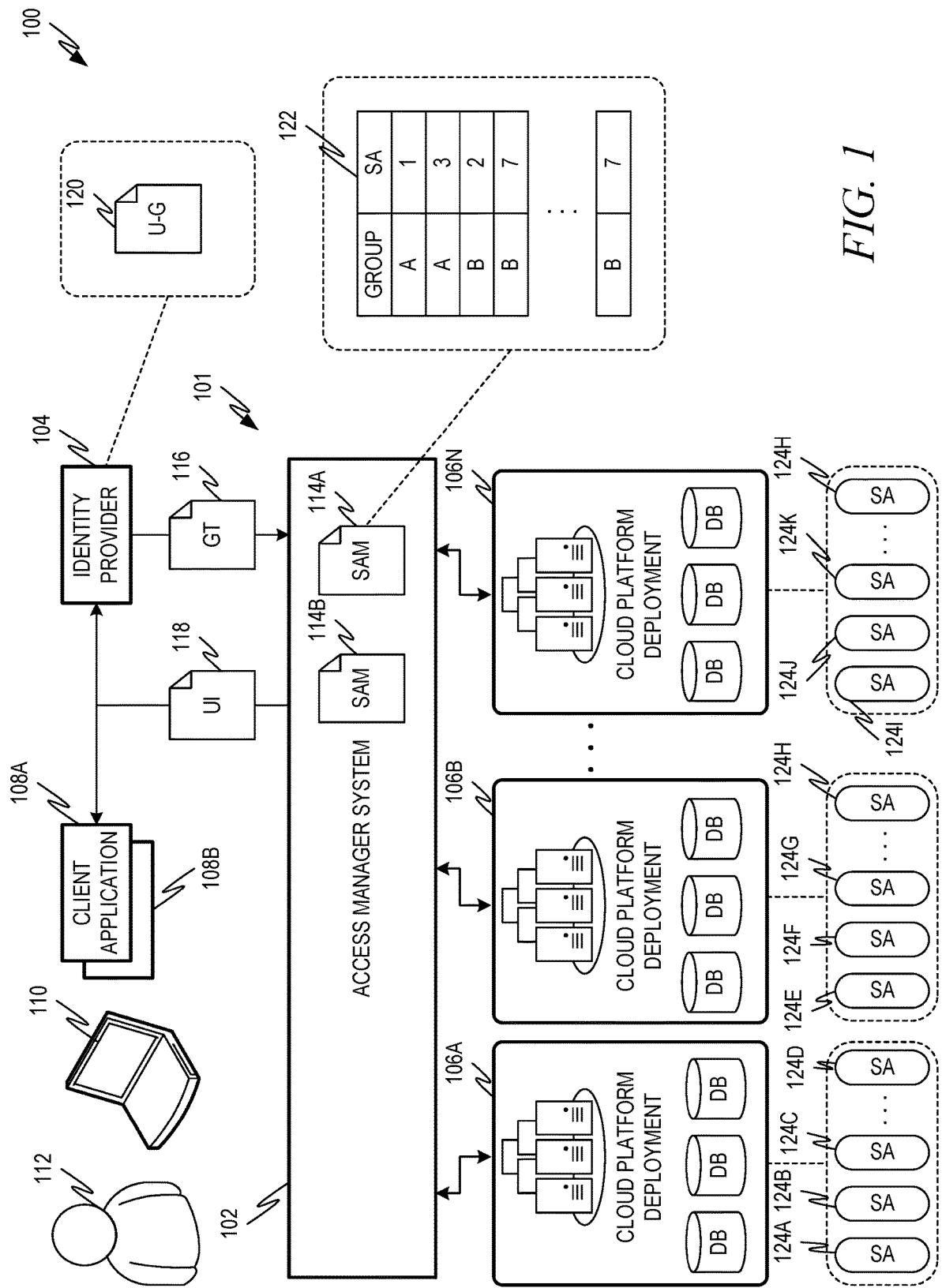
FIG. 1 is a diagram showing one example of an environment including a cloud platform and showing an authorization of a user.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

A cloud platform provides computing services to multiple tenants. The cloud platform comprises cloud platform deployments that can be distributed across multiple data centers in multiple different geographic regions. The tenants of a cloud platform can include enterprises, such as corporations, government agencies, non-profits, or other similar organizations. Each tenant has a set of associated users who access computing services from the cloud platform. The users associated with a tenant may include employees of the tenant, contractors of the tenant, and/or other users having suitable relationships with the tenant. Computing services provided by the cloud platform can include, for example, enterprise applications such as human resources management (HRM) applications, accounting applications, project management applications, customer relationship management (CRM) applications, word processing applications, spreadsheet applications, accounting applications, software development applications, etc.

A cloud platform deployment is a physical computing device or collection of computing devices at a common geographic region used to execute one or more applications and/or persist tenant data. For example, a cloud platform deployment can include a single server at a single datacenter, multiple servers at a single data center, and/or multiple servers distributed over multiple data centers with a common geographic region (such as a state, province, nation, continent, or portion thereof). Consider an example in which a cloud platform is implemented for North America. The cloud platform may include a first cloud platform deployment including servers in the United States, a second cloud platform deployment including servers in Mexico, and third cloud platform deployment including servers in Canada. Other geographic distributions are also contemplated, however.

In providing computing services, a cloud platform is configured to segregate data that is persisted for different tenants. For example, data used to execute a CRM application for Company A is not accessible to the same CRM application when it is executed for Company B. Cloud platforms can segregate tenant data in various different ways. In some examples, a cloud platform (e.g., a cloud platform deployment thereof) implements a separate database and/or database schema for each tenant. Queries to read and/or write to data during execution of applications for that tenant are made to a database and/or database schema associated with the tenant. In other examples, data for multiple tenants is persisted at a common database, but data records are marked to indicate their corresponding tenant. For example, data records may include a tenant column indicating the corresponding tenant. Read queries during execution of applications for the tenant are modified to include a filter based on the tenant column to return only data persisted for the tenant.

Sometimes, it is desirable to configure a cloud platform to segregate persisted data between users associated with the same tenant. For example, a tenant using the cloud platform to provide an HRM application may want to permit some users from its human resources department to view and/or edit HRM data but may not want all employees to have these privileges. In various examples, this capability is provided by providing a tenant with multiple subaccounts.

A subaccount is hosted at a particular cloud platform deployment and has associated data persisted in a manner that permits the cloud platform deployment to distinguish data persisted for the subaccount from data persisted for other subaccounts. This can be accomplished, for example, using techniques similar to those used to segregate data persisted for different tenants including, for example, using dedicated databases or database schemas for different subaccounts and/or using a subaccount database column to label various records with their corresponding subaccounts.

In some examples, a tenant is permitted to select a cloud platform deployment for hosting a given subaccount. The tenant may make its selection of a particular cloud platform deployment for various reasons. For example, a tenant may select a cloud platform deployment at a geographic region or area that is close to the tenant and/or the users who will be using a given subaccount. This may reduce network latency experienced by the tenant's users. In some examples, a tenant selects a cloud platform deployment for regulatory reasons. For example, some jurisdictions may have particular rules governing the storage of data, such as personal customer data. Regulatory rules may govern, for example, how data is stored, where data is stored, where data is stored first, etc. A tenant may select a cloud platform deployment in a jurisdiction specified by the relevant regulatory scheme and/or a cloud platform deployment that manages data according to the rules established by the relevant regulatory scheme.

It will be appreciated that with multiple tenants, multiple cloud platform deployments, and sometimes multiple subaccounts at a given cloud platform deployment, managing permissions for a cloud platform can be challenging. When a user logs on to the cloud platform, the cloud platform associates the user with a given tenant and then determines what authorization scope or scopes that user possesses. An authorization scope, also referred to herein as a scope, indicates that a user is permitted to read and/or write specified data. A scope can describe a subaccount. For example a scope subaccount.read may grant authorization to read data persisted for a subaccount. Also, for example, a scope subaccount.write may grant authorization to write data for or from a subaccount.

Because the subaccounts for the tenant may be hosted by a range of geographically-distributed cloud platform deployments, determining the scopes granted to any particular user can involve querying each cloud platform deployment hosting a subaccount for the tenant to retrieve a list of scopes assigned to the user. Such queries, however, take time to produce responses, leading to increased latency for the user. For example, where the cloud platform provides a cockpit UI, the process of querying multiple cloud platform deployments at distributed geographic locations can add seconds to the UI rendering time, degrading the user experience accordingly.

Various examples address these and other problems by aggregating authorizations in a cloud platform utilizing an access manager system in communication with the various cloud platform deployments. The access manager system receives a user logon request along with a group token indicating a group or groups of users to which the user requesting logon belongs. In some examples, the group token is received from an identity provider system. For example, the user may authenticate to the identity provider system. The identity provider system maintains data indicating associations between users for a given tenant and groups. The identity provider system determines the groups to which the authenticated user is assigned and generates the group token. The identity provider provides the access manager with a group token indicating that the user has been authenticated and including an indication of one or more groups to which the user is assigned.

The access manager system maintains one or more subaccount access maps, as described herein. The subaccount access map includes correlations between groups and subaccounts. The access manager system consults the subaccount access map to identify one or more subaccounts for which the user's associated group has one or more scopes. Indications of the identified subaccount or subaccounts (if any) are provided to the user. In examples where the cloud platform provides a cockpit UI, the cockpit UI may be populated with links corresponding to the identified subaccounts. The user selects a given link to access the corresponding subaccount. In this way, the cloud platform determines subaccounts that a user is permitted to access without the need to query each cloud platform deployment, leading to less latency and improved user experience.

FIG. 1 is a diagram showing one example of an environment 100 including a cloud platform 101 and showing an authorization of a user 112. The environment 100 includes the cloud platform 101, an identity provider system 104 and a user computing device 110 that executes one or more client applications 108A, 108B for the user 112.

The cloud platform 110 includes multiple cloud platform deployments 106A, 106B, 106N. Although three cloud platform deployments 106A, 106B, and 106N are shown, the cloud platform 101 may include more or fewer cloud platform deployments, for example, depending on the implementation. The cloud platform deployments 106A, 106B, 106N may be implemented in different geographic regions. For example, a first cloud platform deployment 106A may be implemented by one or more servers at one or more data centers in North America; a second cloud platform deployment 106B may be implemented by one or more servers at one or more data centers in east Asia, a third cloud platform deployment 106N may be implemented by one or more servers at one or more data centers in Europe, and so on. In some examples, more than one cloud platform deployment 106A, 106B, 106N is implemented in the same geographic region.

FIG. 1 also shows subaccounts 124A, 124B, 124C, 124D, 124E, 124F, 124G, 124H, 124I, 124J, 124K, 124H, with different subaccounts hosted at different cloud platform deployments 106A, 106B, 106N. In the example of FIG. 1, cloud platform deployment 106A hosts subaccounts 124A, 124B, 124C, 124D. Cloud platform deployment 106B hosts subaccounts 124E, 124F, 124G, 124H. Cloud platform deployment 106C hosts subaccounts 124I, 124J, 124K, 124H. The subaccounts 124A, 124B, 124C, 124D, 124E, 124F, 124G, 124H, 124I, 124J, 124K, 124H may be implemented for any suitable combination of tenants. In one example, subaccounts 124A, 124C, and 124E are implemented for one tenant, subaccounts 124B, 124D, 124J, and 124H for a second tenant and so on. Also, it will be appreciated that the arrangement of cloud platform deployments 106A, 106B, 106N and subaccounts 124A, 124B, 124C, 124D, 124E, 124F, 124G, 124H, 124I, 124J, 124K, 124H shown in FIG. 1 is provided for example purposes. In practice, various cloud platform deployments 106A, 106B, 106N may host more or fewer subaccounts than are shown in FIG. 1.

Figure 2:
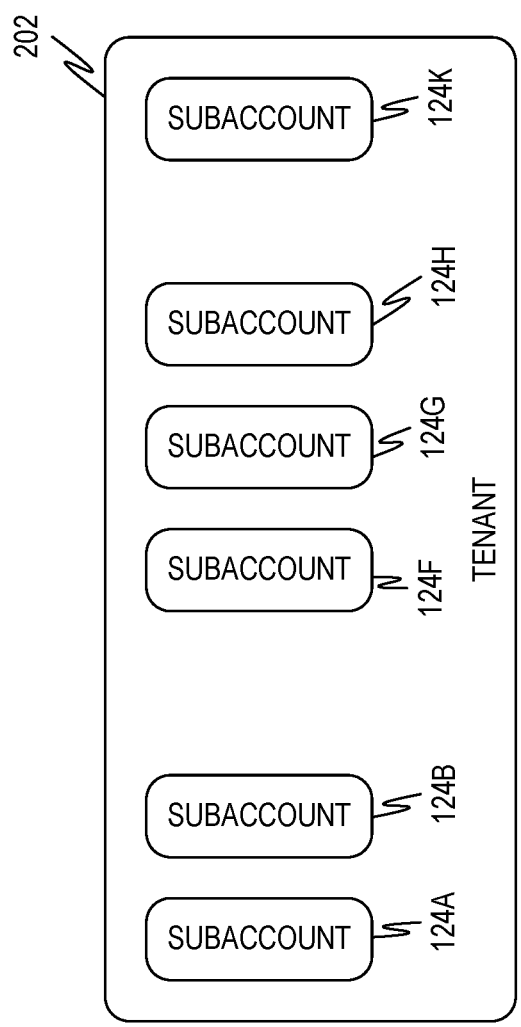
FIG. 2 shows one example arrangement of a tenant and associated subaccounts.

FIG. 2 shows one example arrangement of a tenant 202 and associated subaccounts 124A, 124B, 124F, 124G, 124H, 124K. In this example, the tenant 202 includes subaccounts 124A and 124B that are hosted by cloud platform implementation 106A, subaccounts 124F, 124G, 124H that are hosted by cloud platform implementation 106B, and subaccount 124K that is hosted by cloud platform implementation 124K. (See FIG. 1.) Remaining subaccounts 124C, 124E, 124I, 124K may be implemented for other tenants (not shown). The tenant 202 might use the arrangement shown in FIG. 2 for any suitable reasons. It will be appreciated that the example of FIG. 2 is just one example arrangement of subaccounts among tenants Referring again to FIG. 1, each cloud platform deployment 106A, 106B, 106N includes one or more databases, labeled "DB" in FIG. 1. A database at a cloud platform deployment 106A, 106B, 106N can be dedicated to particular tenant, dedicated to a particular subaccount 124A, 124B, 124C, 124D, 124E, 124F, 124G, 124H, 124I, 124J, 124K, 124H and/or can support multiple tenants and/or multiple subaccounts 124A, 124B, 124C, 124D, 124E, 124F, 124G, 124H, 124I, 124J, 124K, 124H.

A database dedicated to a particular tenant persists data only for that tenant. Such a database may include data for multiple subaccounts 124A, 124B, 124C, 124D, 124E, 124F, 124G, 124H, 124I, 124J, 124K, 124H associated with the tenant. A database dedicated to a particular subaccount 124A, 124B, 124C, 124D, 124E, 124F, 124G, 124H, 124I, 124J, 124K, 124H may persist data only for that subaccount 124A, 124B, 124C, 124D, 124E, 124F, 124G, 124H, 124I, 124J, 124K, 124H. A database that persists data for multiple tenants and/or multiple subaccounts can segregate the persisted data between subaccounts and/or tenants, for example, as described herein. (E.g., using separate schemas for different tenants or subaccounts, using a tenant or subaccount column in database tables, etc.)

Subaccounts 124A, 124B, 124C, 124D, 124E, 124F, 124G, 124H, 124I, 124J, 124K, 124H can be associated with scopes. A scope describes actions that may be taken with respect to a particular subaccount or a portion thereof. For example, a scope may permit the holder of the scope (e.g., the user 112) to read data described by the scope. For example, the scope subaccount.read for a given subaccount may enable its holder to read data persisted for the subaccount. An example scope subaccount.write for a given subaccount may enable its holder to write to data persisted for the subaccount. A scope may cover an entire subaccount (e.g., all of the data persisted for a subaccount) or less than all of a subaccount.

In some examples, scopes are aggregated into roles and/or role collections. A role describes a function or responsibility of a user that is associated with one or more scopes. For example, a role platform developer may include a scope that permits the developer to have read access to a subaccount called Project X. According, the role platform developer may include a scope subaccount.read for the subaccount Project X The role platform developer, in some examples, includes other scopes for other subaccounts and/or the same subaccount. For example, the role platform developer may also include a scope subaccount.write for the subaccount Project X A role collection is a collection of roles that includes multiple roles. For example, a role collection developer may include the role platform developer as well as other roles (e.g., user interface developer, database developer, development project manager, etc.).

The user 112 is associated with a tenant of the cloud platform 101. The user computing device 110 may be any suitable computing device including, for example, a mobile telephone, a tablet computing device, a laptop computing device, a desktop computing device, etc. In some examples, the user 112 is a human user. In FIG. 1, the example client applications 108A, 108B is operated by a human user 112. In some examples, the user is non-human (e.g., a software or hardware component). For example, the client applications 108A, 108B may have a user account with the access manager system 102 that does not require human intervention to use. Accordingly, client applications 108A, 108B, in some examples, does not include the user 112 and/or operate independent of the user 112.

To access the cloud platform 101, the user 112 (e.g., via a client application 108A, 108B) authenticates to an identity provider system 104. The user 112 may authenticate with the identity provider system 104 before requesting a logon at the cloud platform 101. In some examples, the user 112 first requests a logon from the access manager system 102. In these examples, the access manager system 102 directs the user 112 to the identity provider system 104 for authentication. In other examples, the user 112 initially authenticates with the identity provider system 104 and then requests logon at the access manager system 102.

The identity provider system 104 authenticates the user 112 using any suitable method. In some examples, the identity provider system 104 authenticates the user using single factor authentication, such as, for example, a user name and password. In other examples, the identity provider system 104 authenticates the user 112 using two-factor authentication or any other suitable technique. The identity provider system 104 includes user/group data 120 that ties users 112 to particular groups.

The association between users and groups indicated by the user/group data 120 is provided by a tenant. In this way, the tenant may decide whether a particular user should be added to or removed from a group. The tenant may provide the user/group data 120 to the identity provider system 104. For example, an administrative user associated with the tenant may access and/or modify the user/group data 120 to change the association between given users, such as the user 112, and one or more groups.

When the user 112 is authenticated by the identity provider system 104, the identity provider system 104 provides a group token 116 to the access manager system 102. The group token 116 indicates the user 112 and one or more groups to which the user 112 is associated. The group token 116 can be in any suitable format. In some examples, the identity provider system 104 generates the group token according to the Security Assertion Markup Language (SAML). In some examples, the group token 116 is cryptographically signed by the identity provider system 104. The group token 116, in some examples, is cryptographically signed using a private cryptographic key of the identity provider system 104. Accordingly, the access manager system 102 may verify the group token 116 using a public key known to be associated with the identity provider system 104. Upon receiving the group token 116, the access manager system 114 accesses one or more subaccount access maps 114A, 114B.

A subaccount access map 114A, 114B correlates groups to subaccounts. A group is correlated to a subaccount at a subaccount access map 114A, 114B if the group possesses at least one scope at the subaccount. A group possesses a scope at the subaccount, for example, if the group is associated with a role or role collection at the cloud platform 101 that includes a scope at the subaccount. A group may be correlated to a subaccount at a subaccount access map 114A, 114B generally or with respect to a particular scope or set of scopes. In examples in which a group is correlated to subaccounts generally, the group is correlated to a subaccount at a subaccount access map 114A, 114B if the group possesses any scope at the subaccount. In some implementations, the access manager system 102 utilizes a single subaccount access map 114A, 114B that includes correlations between groups and subaccounts over all roles at the subaccounts. In examples in which groups are correlated to subaccounts with respect to a particular scope or set of scopes, the access manager system 102 may utilize multiple subaccount access maps 114A, 114B, with different subaccount access maps 114A, 114B including correlations for different scopes or sets of scopes. For example, referring to the arrangement of FIG. 1, the subaccount access map 114A may correlate groups to subaccounts for a scope subaccount.read while the subaccount access map 114B may indicate groups correlated to subaccounts by a scope subaccount.write.

An example representation 122 of the subaccount access map 114A is shown in FIG. 1. The representation 122 includes two columns, a "Group" column and a subaccount column labeled "SA." Records in the representation indicate a group and a corresponding subaccount 124A, 124B, 124C, 124D, 124E, 124F, 124G, 124H, 124I, 124J, 124K, 124H.

The access manager system 102 provides a cockpit UI 118 to the user 112 via the user computing device 110. The cockpit UI 118 includes an indication of one or more subaccounts 124A, 124B, 124C, 124D, 124E, 124F, 124G, 124H, 124I, 124J, 124K, 124H to which the user 112 has access. In some examples, the cockpit UI 118 includes one or more selectable links corresponding to one or more subaccounts 124A, 124B, 124C, 124D, 124E, 124F, 124G, 124H, 124I, 124J, 124K, 124H. When the user 112 selects a selectable link, the user 112 may be directed to the subaccount 124A, 124B, 124C, 124D, 124E, 124F, 124G, 124H, 124I, 124J, 124K, 124H associated with the selectable link.

Figure 3:
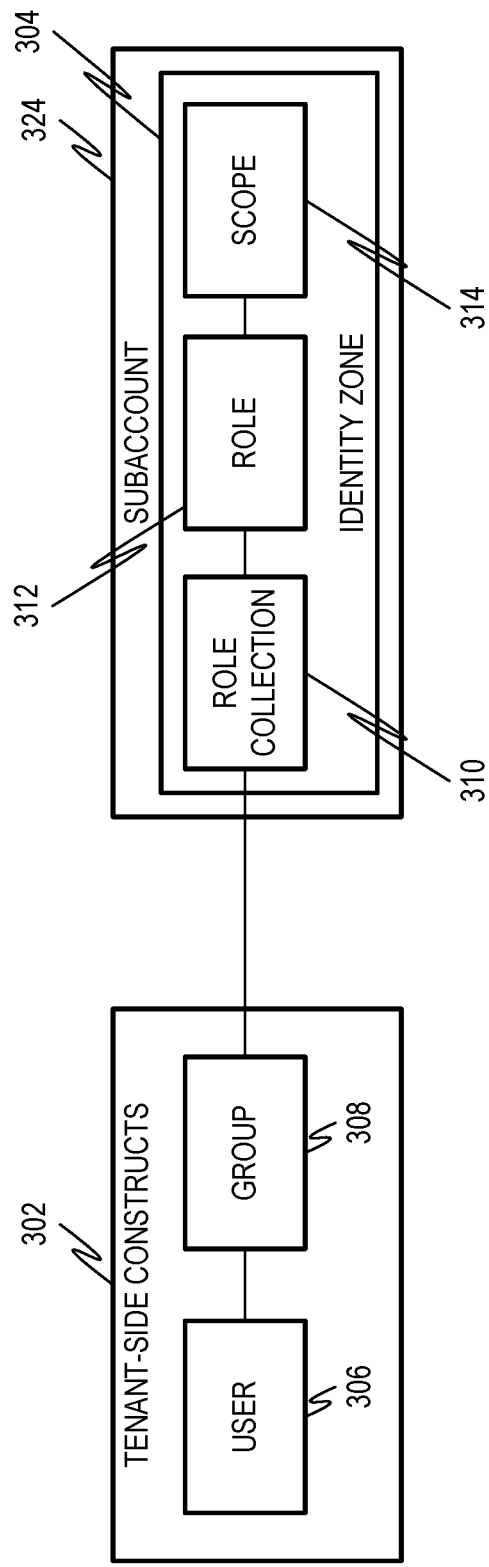
FIG. 3 is a diagram showing an example relationship between tenant-side authorization constructs and cloud-platform side constructs.

FIG. 3 is a diagram showing an example relationship between tenant-side authorization constructs, such as users 306 and groups 308 and cloud-platform side constructs, such as subaccounts 324, scopes 314, roles 312, and role collections 310. Tenant-side constructs 302 are defined by a tenant and include users 306, such as the user 112, and groups 308. Users 306 may be defined by the tenant. For example, the tenant may provide user accounts to one or more users, such as the user 112, who are permitted to utilize the cloud platform 101 on the tenant's behalf. The tenant may also group users 306 into one or more groups 308. A group 308 includes users who have the same scopes at the cloud platform 101.

From the perspective of the cloud platform 101, authorization is expressed in terms of scopes 304, roles, 312, and role collections 310, as described herein. For example, the access manager system 102 may associate a group 308 defined by the tenant with a role 312 and/or role collection 310. The role and/or role collection to which a user's group 308 is assigned may determine the scopes 314 provided to the user.

In the examples described herein, the subaccount access map or maps 114A, 114B provides a shorthand way of determining scopes at the access manager system 102. For example, a role collection 310, its constituent roles 312, and the constituent scopes 314 of the constituent roles 312 may be considered part of an identity zone 304 associated with a subaccount 324. Accordingly, instead of querying each cloud platform deployment 106A, 106B, 106N for subaccounts 124A, 124B, 124C, 124D, 124E, 124F, 124G, 124H, 124I, 124J, 124K, 124H associated with a given group 308, the access manager system 102 may maintain the subaccount access map 114, as described. In some examples, role collections 310 are omitted and groups 308 are associated directly to roles 312.

Figure 4:
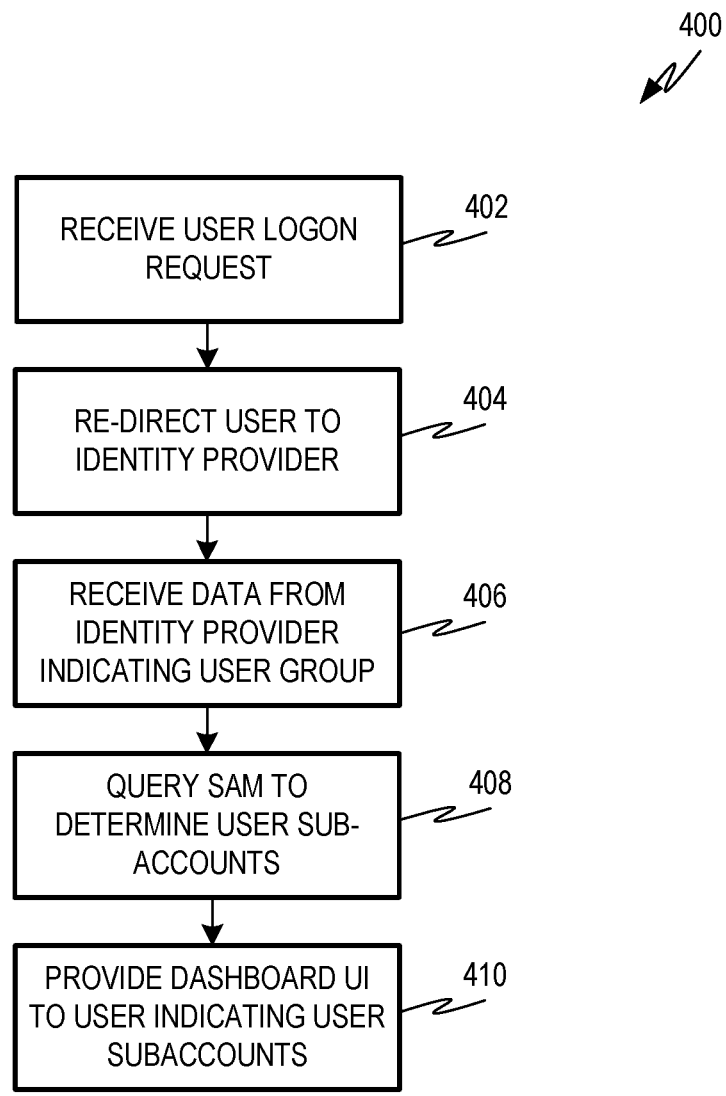
FIG. 4 is a flowchart showing one example of a process flow that may be executed in the environment of FIG. 1 to provide a cockpit user interface (UI) to the user.

FIG. 4 is a flowchart showing one example of a process flow 400 that may be executed in the environment 100 to provide a cockpit UI 118 to the user 112. At operation 402, the access manager system 102 receives a logon request. The logon request originates from the user 112, for example, via the user computing device and/or client application 108A, 108B. At operation 404, the access manager system 102 redirects the user 112 to the identity provider system 104. The identity provider system 104 authenticates the user 112 and, using the user/group data 120, identifies one or more groups to which the user 112 has been assigned on the tenant side.

At operation 406, the access manager system 102 receives a group token 116 indicating the groups to which the user 112 is assigned on the tenant side. The group token 116 may include an indication of the user 112 and/or an indication of the logon request received from the user at operation 402. At operation 408, the access manager system 102 queries the subaccount access map 114 to determine one or more subaccounts 124A, 124B, 124C, 124D, 124E, 124F, 124G, 124H, 124I, 124J, 124K, 124H associated with the group indicated by the group token 116. At operation 410, the access manager system 102 provides the cockpit UI 118 to the user 112, where the cockpit UI 118 indicates one or more subaccounts 124A, 124B, 124C, 124D, 124E, 124F, 124G, 124H, 124I, 124J, 124K, 124H for which the user 112 has been assigned one or more scopes.

A benefit of the subaccount access map 114 is that it may lead to reduced network traffic and/or processor traffic. For example, because the access manager system 102 stores the subaccount access map or maps 114A, 114B locally, it may not be necessary for the access manager system 102 to query cloud platform deployments 106A, 106B, 106N to respond to user logon requests. Further, because subaccount access map or maps 114A, 114B correlate tenant-side groups directly to subaccounts 124A, 124B, 124C, 124D, 124E, 124F, 124G, 124H, 124I, 124J, 124K, 124H, the process of maintaining the subaccount access map or maps 114A, 114B in an up-to-date state may be simplified. For example, it may not be necessary for the access manager system 102 to maintain a mirror of all scopes granted at the various cloud platform deployments 106A, 106B, 106N. Instead, the access manager system 102 may simply monitor changes to the assignment of groups to roles, and/or role collections. Changes that result in a new correlation between a group and a subaccount or that result in the removal of an existing correlation between a group and a subaccount may cause the access manager system 102 to update one or more subaccount access maps 114A, 114B. As will be demonstrated below, not all changes to groups, role collections, and/or roles will result in changes to the subaccount access map or maps 114A, 114B.

Consider an example in which the tenant changes the group or groups to which the user 112 is assigned. This change may be transparent to the access manager system 102. For example, if the user's group is changed, the tenant may cause a corresponding change in the user/group data 120 at the identity provider. Accordingly, the identity provider system 104, upon receiving logon data from the user, may report the updated group or groups to which the user 112 belongs with the group token 116.

Figure 5:
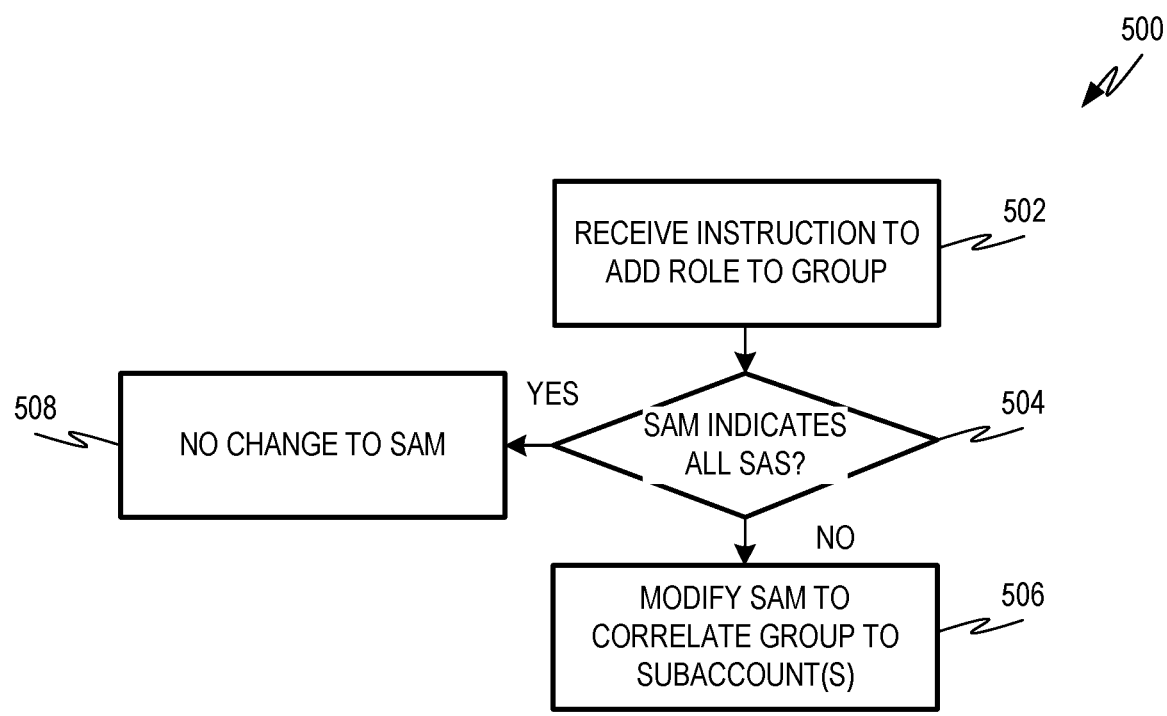
FIG. 5 is a flowchart showing one example of a process flow that may be executed by the access manager system to update the subaccount access map when a role is added to a group.

FIG. 5 is a flowchart showing one example of a process flow 500 that may be executed by the access manager system 102 to update the subaccount access map when a role is added to a group. At operation 502, the access manager system 102 receives an instruction to add a role to a given group. The instruction can be provided by a tenant. For example, an administrative user associated with the tenant (e.g., a user associated with a group administrative users) may be associated with a scope that permits the users to change associations between groups and roles. Such an administrative user may provide the instruction of operation 502.

At operation 504, the access manager system 102 determines if the subaccount access map or maps 114A, 114B presently correlates the group with all of the subaccounts that are associated with the role that is to be added to the group. In examples in which different subaccount access maps 114A, 114B correspond to different scopes, operation 504 may include checking the subaccount access map 114A, 114B that is associated with the scope or scopes associated with the role that is to be added to the group and may not consider other subaccount access maps 114A, 114B.

If the group is presently correlated with all of the subaccounts associated with the role at the appropriate subaccount access map 114A, 114B, then no change to the subaccount access map 114A, 114B is made at operation 508. On the other hand, if the group is not presently correlated with all of the subaccounts associated with the role, then the access manager system 102 modifies the appropriate subaccount access map 114A, 114B to add any subaccounts that are associated with the new role but not previously correlated to the group at the subaccount access map 114A, 114B.

The process flow 500 is described in terms of a role being added to a group but would be similarly executed when a role collection is added to a group. Consider an example in which a group called US_developers is assigned to a role collection called developer in a subaccount called project X. In this example, the role collection developer includes a role platform_developer and the platform_developer role includes a subaccount.read scope for the subaccount project X. In this example, the group US developers is not otherwise correlated to the subaccount project X. Accordingly, the access manager system 102 modifies the appropriate subaccount access map 114A, 114B to correlate the subaccount project X with the group US developers.

In some examples, a role is added to a role collection. The access manager system 102 receives an indication of the role and the role collection. The role is associated with at least a first scope at a first subaccount. The access manager system 102 determines whether the first role collection includes any other roles having the first scope at the first subaccount. If the first role collection does not include any such roles, the access manager system 102 finds a set of groups associated with the first role collection and modifies the subaccount access menu to correlate the set of groups to the subaccount.

Figure 6:
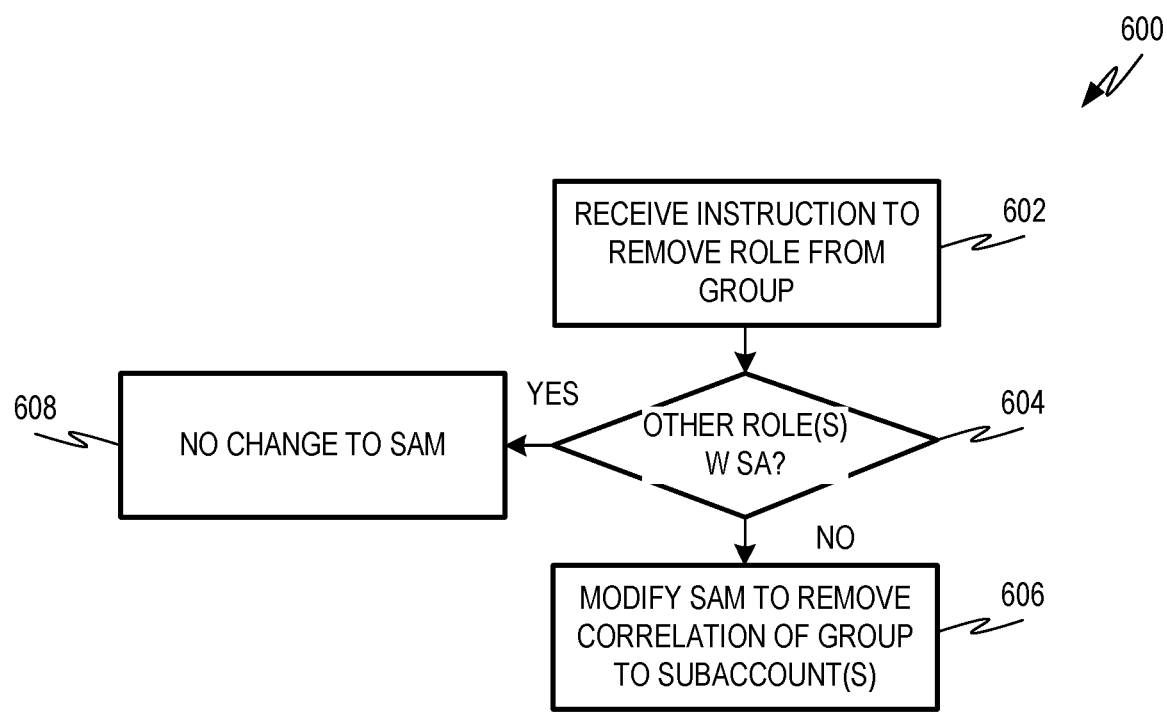
FIG. 6 is a flowchart showing one example of a process flow that may be executed by the access manager system to update the subaccount access map when a role is removed from a group.

FIG. 6 is a flowchart showing one example of a process flow 600 that may be executed by the access manager system 102 to update one or more subaccount access maps 114A, 114B when a role is removed from a group. At operation 602, the access manager system 102 receives an instruction to remove a role from a given group. The instruction can be provided by a tenant. For example, an administrative user associated with the tenant (e.g., a user associated with a group administrative users) may be associated with a scope that permits the users to change associations between groups and roles. Such an administrative user may provide the instruction of operation 602.

The role to be removed from the group is associated with one or more scopes, for example, as illustrated at FIG. 3. At operation 604, the access manager system 102 determines if the group is associated with any other roles that include the one or more scopes at the same subaccount or subaccounts associated with the role that is to be removed from the group. If the group is associated with such a role or roles, then no changes to the subaccount access map or maps 114A, 114B are made at operation 608. On the other hand, if the role to be removed from the group includes one or more scopes at a subaccount that are not correlated to the group by any other assigned roles, then the access manager system 102 modifies one or more subaccount access map or maps 114A, 114B to remove correlations between the group and any such subaccounts at operation 606.

Similar to FIG. 5, the process flow 600 of FIG. 6 can also be similarly executed in examples where a role collection is removed from a group. Consider an example in which a role collection including a role with a subaccount.read scope for a subaccount Project X is removed from a group. The access manager system 102 may review other roles and/or role collections assigned to the group to determine if any include the scope subaccount.read for the subaccount Project X. If no other roles or role collections assigned to the group include the indicated scope, then the subaccount access map 114A, 114B associated with the scope Project X is modified to remove a correlation between Project X and the group.

Figure 7:
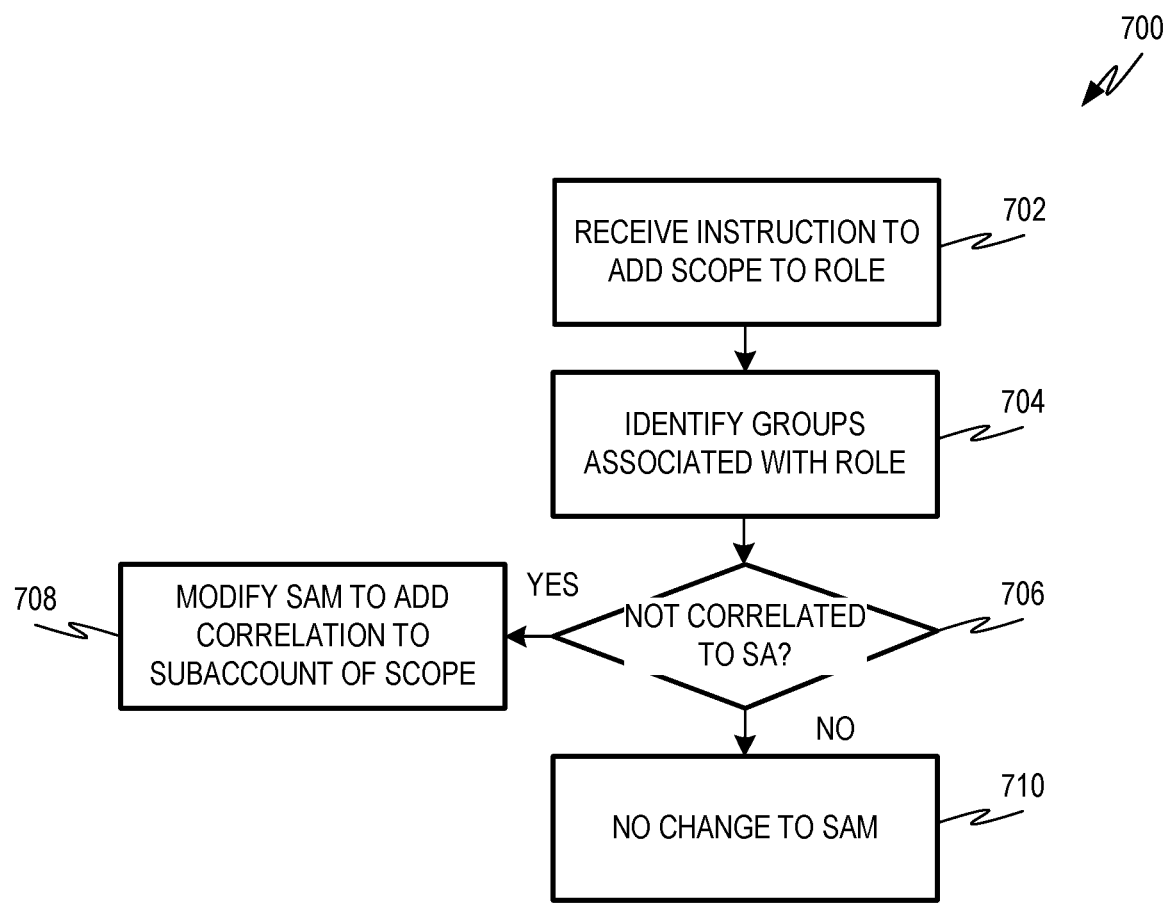
FIG. 7 is a flowchart showing one example of a process flow that may be executed by the access manager system to update the subaccount access map when a scope is added to a role.

FIG. 7 is a flowchart showing one example of a process flow 700 that may be executed by the access manager system 102 to update the subaccount access map or maps 114A, 114B when a scope is added to a role. In some examples, the assignment of scopes to roles is managed at the cloud platform 101. For example, a developer and/or administrator of the cloud platform 101 may set and/or modified the assignment of scopes to roles and/or of roles to role collections.

At operation 702, the access manager system 102 receives an instruction to add a scope to a role. The instruction specifies the scope and the role to which the scope is to be added. The scope to be added relates to a particular subaccount. At operation 704, the access manager system 102 identifies one or more groups that are associated with the role to which the scope is to be added. At operation 706, the access manager system 102 determines if any of the associated groups are not already correlated to the subaccount of the scope at the subaccount access map (e.g., the subaccount access map 114A, 114B corresponding to the scope). If all groups are already correlated to the subaccount at the relevant subaccount access map or maps 114A, 114B, the access manager system 102 makes no changes to the subaccount access map 114A, 114B at operation 710. On the other hand, if any of the groups are not correlated to the subaccount, the access manager system 102 modifies the appropriate subaccount access map 114A, 114B, at operation 708, to add correlations between the subaccount of the scope and any groups that were not previously correlated to the subaccount.

Consider an example in which a scope subaccount.read is added to a role platform auditor that is in subaccount Project X. In this example, the access manager system 102 may determine that a group US auditors is associated with the role platform auditor. Accordingly, the access manager system 102 may correlate the subaccount Project X to the group US auditors at the subaccount access map or maps 114A, 114B correspond to the scope or scopes of the role platform auditor, if such a correlation does not already exist. In some examples, in which roles are organized into role collections, the access manager system 102 determines groups associated with the indicated scope by identifying one or more role collections that include the role platform auditor. For example, the role collection platform auditor may be associated with a role collection auditor that is, in turn, associated with one or more groups.

Figure 8:
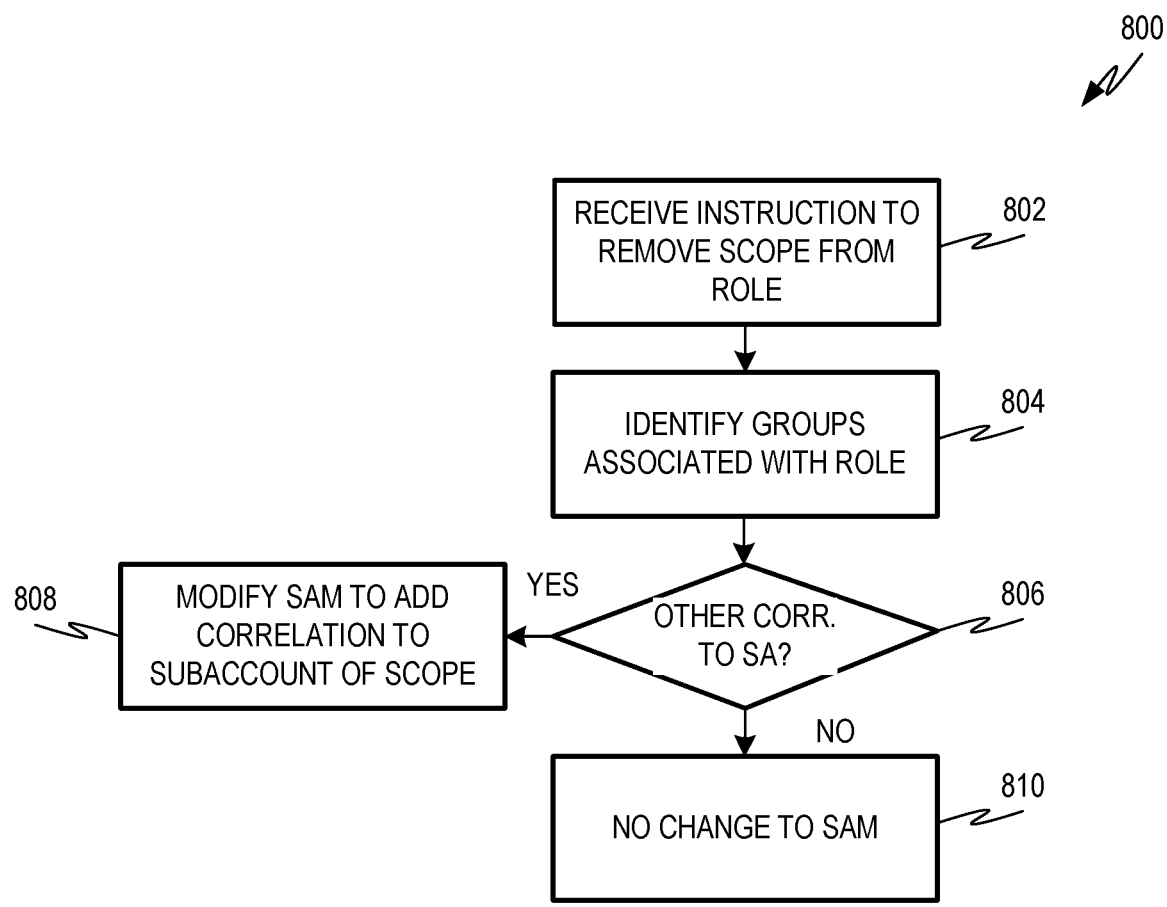
FIG. 8 is a flowchart showing one example of a process flow that may be executed by the access manager system to update the subaccount access map when a scope is removed from a role.

FIG. 8 is a flowchart showing one example of a process flow 800 that may be executed by the access manager system to update the subaccount access map when a scope is removed from a role. At operation 802, the access manager system 102 receives an instruction to remove a scope from a role. At operation 804, the access manager system 102 identifies any groups associated with the role. The access manager system 102, at operation 806, determines if any of the identified groups are associated with any other roles from the same subaccount as the role from which the scope is removed. If all of the groups have another correlation to the subaccount, then the access manager system 102 makes no change to the subaccount access map at operation 810. If any of the groups lack another correlation to the subaccount, the access manager system 102 modifies the subaccount access map to remove correlations between the groups and the subaccount at operation 808.

Examples

Example 1 is a cloud platform system comprising: a plurality of cloud platform deployments, the plurality of cloud platform deployments comprising a first cloud platform deployment implemented at a first geographic region and a second cloud platform deployment implemented at a second geographic region; an access manager system, the access manager system programmed to perform operations comprising: receiving, from a user computing device, a user logon request identifying a user; receiving, from an identity provider system, group data associated with the user logon request, the group data indicating a first group to which the user belongs; determining that a subaccount access map correlates the first group to a first subaccount, the first subaccount implemented at the first cloud platform deployment; and providing to the user computing device an indication that the user is authorized to access the first subaccount.

In Example 2, the subject matter of Example 1 optionally includes wherein the operations further comprise: receiving an instruction to add a first role to the first group, wherein the first role is associated with at least one scope at a second subaccount, the second subaccount implemented at the second cloud platform deployment; determining that the subaccount access map does not correlate the first group to the second subaccount; and modifying the subaccount access map to correlate the first group to the second subaccount.

In Example 3, the subject matter of Example 2 optionally includes wherein receiving the instruction to add the first role to the first group comprises receiving an instruction to add a first role collection to the first group, wherein the first role collection comprises the first role.

In Example 4, the subject matter of any one or more of Examples 1-3 optionally includes wherein the operations further comprise: receiving an instruction to remove a first role from the first group, wherein the first role is associated with at least one scope at the first subaccount; determining that no other role associated with the first group comprises the at least one scope at the first subaccount; and modifying the subaccount access map to remove the correlation between the first group and the first subaccount.

In Example 5, the subject matter of any one or more of Examples 1-4 optionally includes wherein receiving the instruction to remove the first role from the first group comprises receiving an instruction to remove a first role collection from the first group, wherein the first role collection comprises the first role.

In Example 6, the subject matter of any one or more of Examples 1-5 optionally includes wherein the operations further comprise: receiving an indication that a first scope has been added to a first role, wherein the first role is associated with at least one scope at a second subaccount implemented the second cloud platform deployment; determining a set of groups that are associated with the first role, wherein the set of groups comprises the first group; and modifying the subaccount access map to correlate the first group to the second subaccount.

In Example 7, the subject matter of any one or more of Examples 1-6 optionally includes wherein the operations further comprise: receiving an indication that a first role has been added to a first role collection, wherein the first role is associated with at least one scope at a second subaccount implemented the second cloud platform deployment; determining that the first role collection does not includes other roles with a scope at the second subaccount; determining a set of groups associated the first role collection, wherein the set of groups comprises the first group; and modifying the subaccount access map to correlate the first group to the second subaccount.

In Example 8, the subject matter of any one or more of Examples 1-7 optionally includes wherein the operations further comprise: receiving an indication that a first scope at the first subaccount has been removed from a first role associated with the first group; determining that the first role does not includes any other scopes at the first subaccount; and modifying the subaccount access map to remove the correlation between the first group and the first subaccount.

In Example 9, the subject matter of Example 8 optionally includes wherein the operations further comprise determining that a first role collection associated with the first group does not includes any other scopes at the first subaccount, the first role collection including the first role.

In Example 10, the subject matter of any one or more of Examples 1-9 optionally includes wherein providing to the user computing device an indication that the user is authorized to access the first subaccount comprises providing a user interface to the user computing device, wherein the user interface comprises a first selectable link that, when selected, provides the user with access to the first subaccount.

Example 11 is a method for aggregating authorizations in a cloud platform, the method comprising: receiving, by an access manager system of the cloud platform and from a user computing device, a user logon request identifying a user; receiving, by the access manager system and from an identity provider system, group data associated with the user logon request, the group data indicating a first group to which the user belongs; determining, by the access manager system, that a subaccount access map correlates the first group to a first subaccount, the first subaccount implemented at a first cloud platform deployment of the cloud platform, the first cloud platform deployment implemented at a first geographic region; and providing, by the access manager system and to the user computing device, an indication that the user is authorized to access the first subaccount.

In Example 12, the subject matter of Example 11 optionally includes receiving an instruction to add a first role to the first group, wherein the first role is associated with at least one scope at a second subaccount, the second subaccount implemented at a second cloud platform deployment implemented at a second geographic region; determining that the subaccount access map does not correlate the first group to the second subaccount; and modifying the subaccount access map to correlate the first group to the second subaccount.

In Example 13, the subject matter of Example 12 optionally includes wherein receiving the instruction to add the first role to the first group comprises receiving an instruction to add a first role collection to the first group, wherein the first role collection comprises the first role.

In Example 14, the subject matter of any one or more of Examples 11-13 optionally includes receiving an instruction to remove a first role from the first group, wherein the first role is associated with at least one scope at the first subaccount; determining that no other role associated with the first group comprises the at least one scope at the first subaccount; and modifying the subaccount access map to remove the correlation between the first group and the first subaccount.

In Example 15, the subject matter of any one or more of Examples 11-14 optionally includes wherein receiving the instruction to remove the first role from the first group comprises receiving an instruction to remove a first role collection from the first group, wherein the first role collection comprises the first role.

In Example 16, the subject matter of any one or more of Examples 11-15 optionally includes receiving an indication that a first scope has been added to a first role, wherein the first role is associated with at least one scope at a second subaccount implemented the second cloud platform deployment; determining a set of groups that are associated with the first role, wherein the set of groups comprises the first group; and modifying the subaccount access map to correlate the first group to the second subaccount.

In Example 17, the subject matter of any one or more of Examples 11-16 optionally includes receiving an indication that a first role has been added to a first role collection, wherein the first role is associated with at least one scope at a second subaccount implemented at a second cloud platform deployment; determining that the first role collection does not includes other roles with a scope at the second subaccount; determining a set of groups associated the first role collection, wherein the set of groups comprises the first group; and modifying the subaccount access map to correlate the first group to the second subaccount.

In Example 18, the subject matter of any one or more of Examples 11-17 optionally includes receiving an indication that a first scope at the first subaccount has been removed from a first role associated with the first group; determining that the first role does not includes any other scopes at the first subaccount; and modifying the subaccount access map to remove the correlation between the first group and the first subaccount.

In Example 19, the subject matter of Example 18 optionally includes determining that a first role collection associated with the first group does not includes any other scopes at the first subaccount, the first role collection including the first role.

Example 20 is a non-transitory machine-readable medium comprising instructions thereon that, when executed by at least one processor, causes the at least one processor to perform operations comprising: receiving from a user computing device, a user logon request identifying a user; receiving from an identity provider system, group data associated with the user logon request, the group data indicating a first group to which the user belongs; determining that a subaccount access map correlates the first group to a first subaccount, the first subaccount implemented at a first cloud platform deployment of the cloud platform, the first cloud platform deployment implemented at a first geographic region; and providing to the user computing device, an indication that the user is authorized to access the first subaccount.

Figure 9:
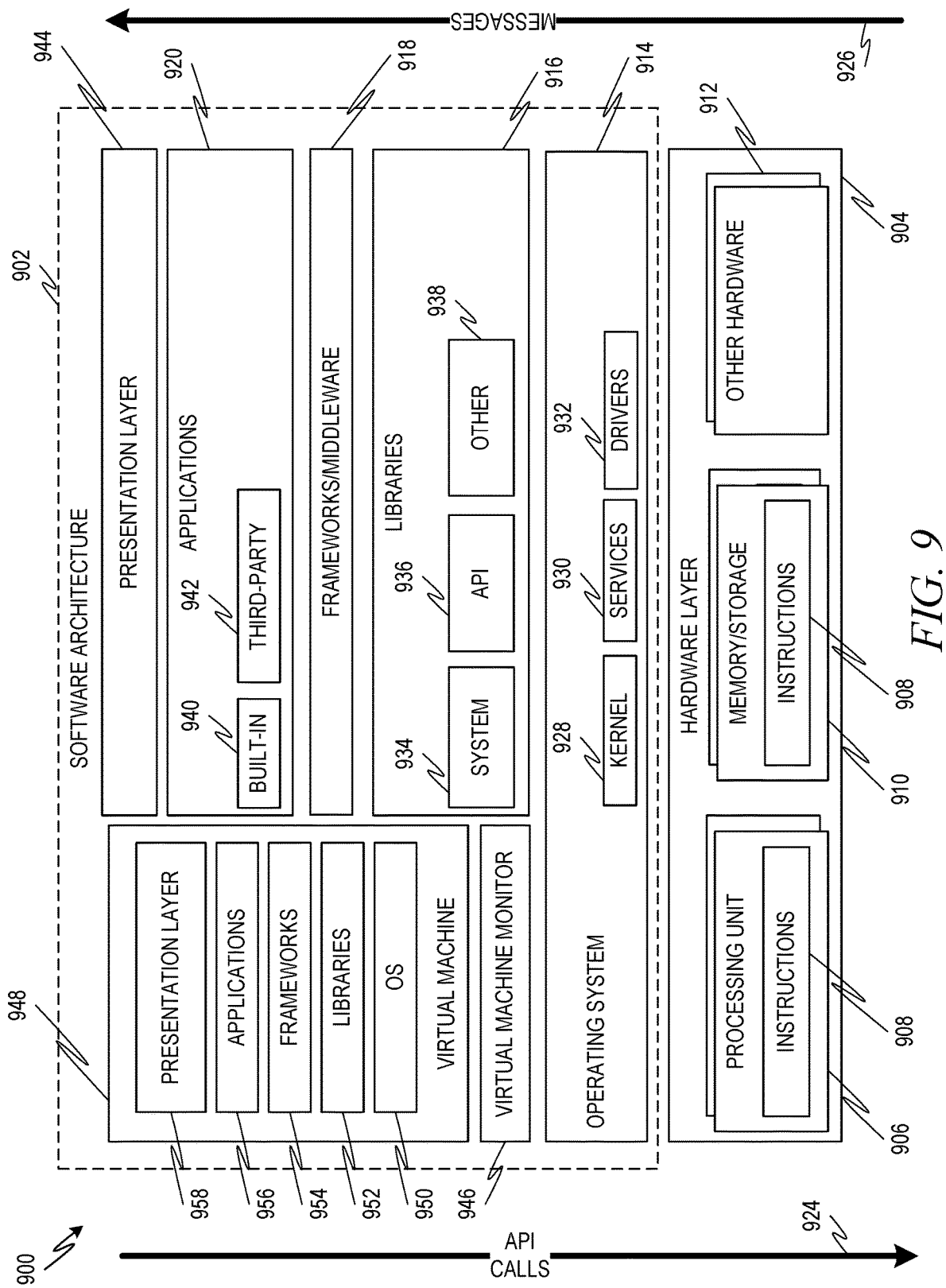
FIG. 9 is a block diagram showing one example of a software architecture for a computing device.

FIG. 9 is a block diagram 900 showing one example of a software architecture 902 for a computing device. The architecture 902 may be used in conjunction with various hardware architectures, for example, as described herein. FIG. 9 is merely a non-limiting example of a software architecture and many other architectures may be implemented to facilitate the functionality described herein. A representative hardware layer 904 is illustrated and can represent, for example, any of the above referenced computing devices. In some examples, the hardware layer 904 may be implemented according to the architecture of the computer system of FIG. 9.

The representative hardware layer 904 comprises one or more processing units 906 having associated executable instructions 908. Executable instructions 908 represent the executable instructions of the software architecture 902, including implementation of the methods, modules, subsystems, and components, and so forth described herein and may also include memory and/or storage modules 910, which also have executable instructions 908. Hardware layer 904 may also comprise other hardware as indicated by other hardware 912 which represents any other hardware of the hardware layer 904, such as the other hardware illustrated as part of the software architecture 902.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920 and presentation layer 944. Operationally, the applications 920 and/or other components within the layers may invoke application programming interface (API) calls 924 through the software stack and access a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. In some examples, the services 930 include an interrupt service. The interrupt service may detect the receipt of an interrupt and, in response, cause the architecture 902 to pause its current processing and execute an interrupt service routine (ISR) when an interrupt is accessed.

The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 10D in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 and/or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a contacts application, a browser application, a book reader application, a location application, a media application, a messaging application, and/or a game application. Third-party applications 942 may include any of the built in applications as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third-party application 942 may invoke the API calls 924 provided by the mobile operating system such as operating system 914 to facilitate functionality described herein.

The applications 920 may utilize built in operating system functions (e.g., kernel 928, services 930 and/or drivers 932), libraries (e.g., system 934, APIs 936, and other libraries 938), frameworks/middleware 918 to create user interfaces to interact with users of the system. Alternatively, or additionally, in some systems interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware computing device. A virtual machine is hosted by a host operating system (operating system 914) and typically, although not always, has a virtual machine monitor 946, which manages the operation of the virtual machine as well as the interface with the host operating system (i.e., operating system 914). A software architecture executes within the virtual machine such as an operating system 950, libraries 952, frameworks/middleware 954, applications 956 and/or presentation layer 958. These layers of software architecture executing within the virtual machine 948 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 10:
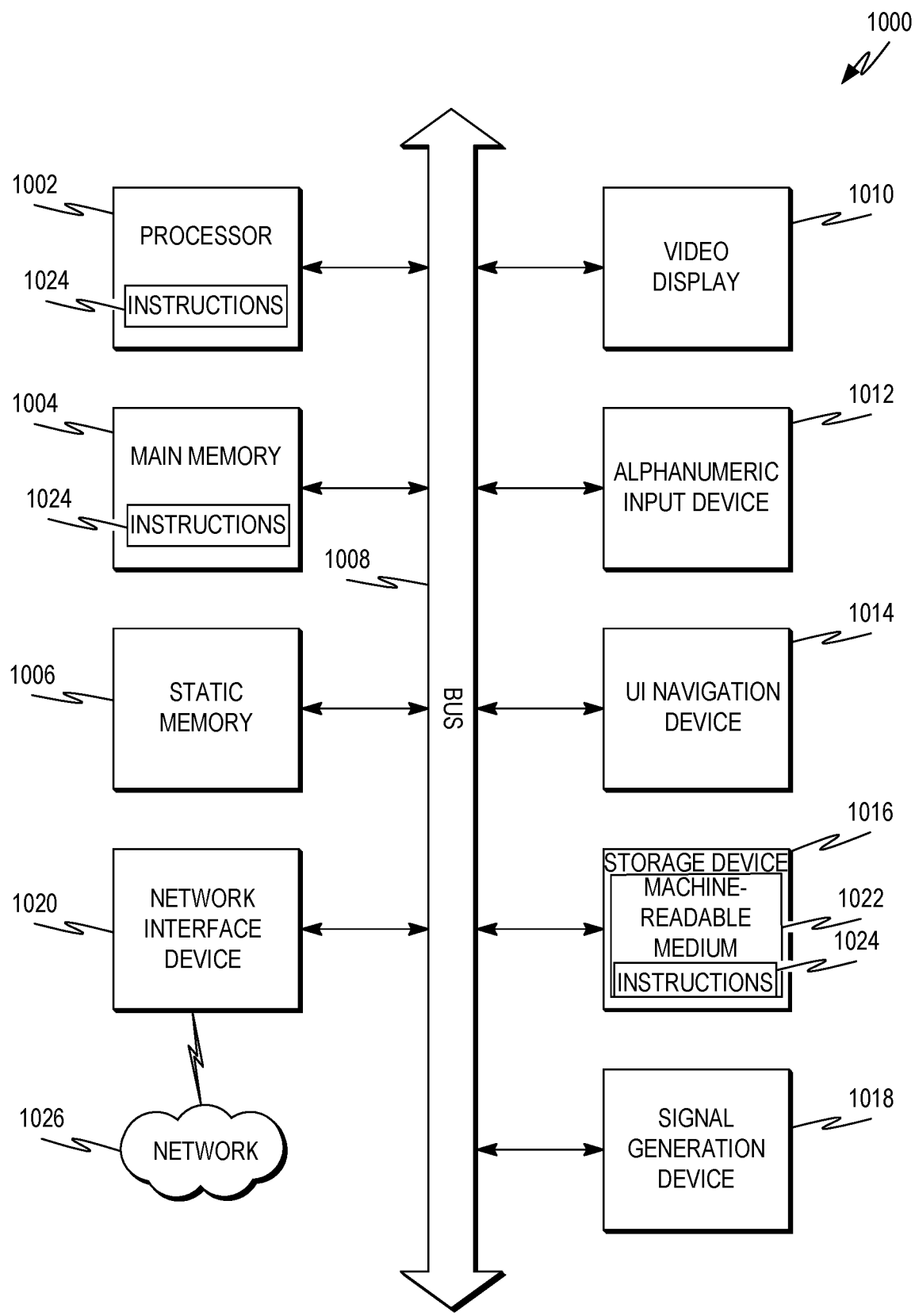
FIG. 10 is a block diagram of a machine in the example form of a computing system within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation (or cursor control) device 1014 (e.g., a mouse), a disk drive unit 1016, a signal generation device 1018 (e.g., a speaker), and a network interface device 1020.

Machine-Readable Medium

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting machine-readable media 1022.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A cloud platform system comprising:
a plurality of cloud platform deployments, the plurality of cloud platform deployments comprising a first cloud platform deployment implemented at a first geographic region and a second cloud platform deployment implemented at a second geographic region different than the first geographic region; and
an access manager system, the access manager system programmed to perform operations comprising:
receiving, from a user computing device, a user logon request identifying a user;
receiving, from an identity provider system, group data associated with the user logon request, the group data indicating a first group to which the user belongs;
accessing a subaccount access map, the subaccount access map correlating the first group to a first subaccount implemented at the first cloud platform deployment and correlating a second group to a second subaccount implemented at the second cloud platform deployment, the first subaccount and the second subaccount being associated with a first tenant of the cloud platform system;
determining that the subaccount access map correlates the first group to the first subaccount; and
providing to the user computing device an indication that the user is authorized to access the first subaccount.

2. The cloud platform system of claim 1, wherein the operations further comprise:
receiving an instruction to add a first role to the first group, wherein the first role is associated with at least one scope at a second subaccount, the second subaccount implemented at the second cloud platform deployment;
determining that the subaccount access map does not correlate the first group to the second subaccount; and
modifying the subaccount access map to correlate the first group to the second subaccount.

3. The cloud platform system of claim 2, wherein receiving the instruction to add the first role to the first group comprises receiving an instruction to add a first role collection to the first group, wherein the first role collection comprises the first role.

4. The cloud platform system of claim 1, wherein the operations further comprise:
receiving an instruction to remove a first role from the first group, wherein the first role is associated with at least one scope at the first subaccount;
determining that no other role associated with the first group comprises the at least one scope at the first subaccount; and modifying the subaccount access map to remove the correlation between the first group and the first subaccount.

5. The cloud platform system of claim 4, wherein receiving the instruction to remove the first role from the first group comprises receiving an instruction to remove a first role collection from the first group, wherein the first role collection comprises the first role.

6. The cloud platform system of claim 1, wherein the operations further comprise:
receiving an indication that a first scope has been added to a first role, wherein the first role is associated with at least one scope at a second subaccount implemented the second cloud platform deployment;
determining a set of groups that are associated with the first role, wherein the set of groups comprises the first group; and
modifying the subaccount access map to correlate the first group to the second subaccount.

7. The cloud platform system of claim 1, wherein the operations further comprise:
receiving an indication that a first role has been added to a first role collection, wherein the first role is associated with at least one scope at a second subaccount implemented the second cloud platform deployment;
determining that the first role collection does not include other roles with a scope at the second subaccount;
determining a set of groups associated the first role collection, wherein the set of groups comprises the first group; and
modifying the subaccount access map to correlate the first group to the second subaccount.

8. The cloud platform system of claim 1, wherein the operations further comprise:
receiving an indication that a first scope at the first subaccount has been removed from a first role associated with the first group;
determining that the first role does not include any other scopes at the first subaccount; and
modifying the subaccount access map to remove the correlation between the first group and the first subaccount.

9. The cloud platform system of claim 8, wherein the operations further comprise determining that a first role collection associated with the first group does not include any other scopes at the first subaccount, the first role collection including the first role.

10. The cloud platform system of claim 1, wherein providing to the user computing device an indication that the user is authorized to access the first subaccount comprises providing a user interface to the user computing device, wherein the user interface comprises a first selectable link that, when selected, provides the user with access to the first subaccount.

11. A method for aggregating authorizations in a cloud platform, the method comprising:
receiving, by an access manager system of the cloud platform and from a user computing device, a user logon request identifying a user;
receiving, by the access manager system and from an identity provider system, group data associated with the user logon request, the group data indicating a first group to which the user belongs;
accessing, by the access manager system, a subaccount access map, the subaccount access map correlating a first group to a first subaccount and correlating a second group to a second subaccount, the first subaccount being implemented at a first cloud platform deployment of a cloud platform at a first geographic region, the second subaccount being implemented at a second cloud platform deployment being implemented at a second geographic region different than the first geographic region, the first subaccount and the second subaccount being associated with a first tenant of the cloud platform;
determining, by the access manager system, that the subaccount access map correlates the first group to the first subaccount; and
providing, by the access manager system and to the user computing device, an indication that the user is authorized to access the first subaccount.

12. The method of claim 11, further comprising:
receiving an instruction to add a first role to the first group, wherein the first role is associated with at least one scope at a second subaccount, the second subaccount implemented at a second cloud platform deployment implemented at a second geographic region;
determining that the subaccount access map does not correlate the first group to the second subaccount; and
modifying the subaccount access map to correlate the first group to the second subaccount.

13. The method of claim 12, wherein receiving the instruction to add the first role to the first group comprises receiving an instruction to add a first role collection to the first group, wherein the first role collection comprises the first role.

14. The method of claim 11, further comprising:
receiving an instruction to remove a first role from the first group, wherein the first role is associated with at least one scope at the first subaccount;
determining that no other role associated with the first group comprises the at least one scope at the first subaccount; and
modifying the subaccount access map to remove the correlation between the first group and the first subaccount.

15. The method of claim 14, wherein receiving the instruction to remove the first role from the first group comprises receiving an instruction to remove a first role collection from the first group, wherein the first role collection comprises the first role.

16. The method of claim 11, further comprising:
receiving an indication that a first scope has been added to a first role, wherein the first role is associated with at least one scope at a second subaccount implemented the second cloud platform deployment;
determining a set of groups that are associated with the first role, wherein the set of groups comprises the first group; and
modifying the subaccount access map to correlate the first group to the second subaccount.

17. The method of claim 11, further comprising:
receiving an indication that a first role has been added to a first role collection, wherein the first role is associated with at least one scope at a second subaccount implemented at a second cloud platform deployment;
determining that the first role collection does not include other roles with a scope at the second subaccount;
determining a set of groups associated the first role collection, wherein the set of groups comprises the first group; and
modifying the subaccount access map to correlate the first group to the second subaccount.

18. The method of claim 11, further comprising:
receiving an indication that a first scope at the first subaccount has been removed from a first role associated with the first group;
determining that the first role does not include any other scopes at the first subaccount; and
modifying the subaccount access map to remove the correlation between the first group and the first subaccount.

19. The method of claim 18, further comprising determining that a first role collection associated with the first group does not include any other scopes at the first subaccount, the first role collection including the first role.

20. A non-transitory machine-readable medium comprising instructions thereon that, when executed by at least one processor, causes the at least one processor to perform operations comprising:
receiving from a user computing device, a user logon request identifying a user;
receiving from an identity provider system, group data associated with the user logon request, the group data indicating a first group to which the user belongs;
accessing a subaccount access map, the subaccount access map correlating a first group to a first subaccount and correlating a second group to a second subaccount, the first subaccount being implemented at a first cloud platform deployment of a cloud platform at a first geographic region, the second subaccount being implemented at a second cloud platform deployment being implemented at a second geographic region different than the first geographic region, the first subaccount and the second subaccount being associated with a first tenant of the cloud platform;
determining that the subaccount access map correlates the first group to the first subaccount; and
providing to the user computing device, an indication that the user is authorized to access the first subaccount.

* * * * *